(12) United States Patent
Young

(10) Patent No.: US 7,988,219 B2
(45) Date of Patent: Aug. 2, 2011

(54) RECREATIONAL VEHICLE SLIDE OUT ROOF BLOCK

(76) Inventor: Richard E. Young, San Jose, CA (US)

( * ) Notice: Subject to any disclaimer, the term of this patent is extended or adjusted under 35 U.S.C. 154(b) by 422 days.

(21) Appl. No.: 12/247,816

(22) Filed: Oct. 8, 2008

(65) Prior Publication Data

US 2009/0261616 A1 Oct. 22, 2009

Related U.S. Application Data

(60) Provisional application No. 61/124,310, filed on Apr. 16, 2008.

(51) Int. Cl.
*B60P 3/34* (2006.01)
(52) U.S. Cl. .......................... 296/163; 135/88.11; 160/22
(58) Field of Classification Search .................. 296/165, 296/171, 172, 175, 176, 26.01, 26.13, 26.09, 296/163; 160/67, 22, 41, 42; 135/88.12, 135/88.07, 88.1, 88.09; 52/67, 73, 74
See application file for complete search history.

(56) References Cited

U.S. PATENT DOCUMENTS

| | | | |
|---|---|---|---|
| 3,343,556 A | 9/1967 | Stamberger et al. | |
| 4,401,338 A | 8/1983 | Caldwell | |
| 5,145,440 A | 9/1992 | Boris et al. | |
| 5,171,056 A | 12/1992 | Faludy et al. | |
| 6,619,726 B2 | 9/2003 | Jones | |
| 6,679,007 B1 | 1/2004 | Minchew et al. | |
| 7,156,451 B2 * | 1/2007 | Verhelst | 296/163 |
| 2004/0135396 A1 | 7/2004 | Corrillo et al. | |

FOREIGN PATENT DOCUMENTS

DE 3532025 A1 3/1987
* cited by examiner

*Primary Examiner* — Glenn Dayoan
*Assistant Examiner* — Melissa A Black

(57) ABSTRACT

A recreational vehicle slide out roof block prevents foreign material such as water, dirt, or debris from accumulating on a recreational vehicle slide out roof. A slide out roof block has a size and shape selected to fill a gap between a slide out roof and an awning sheet extending over the slide out roof. Embodiments of a slide out roof block comprise a compressible bolster having a rain flap along a bottom edge of a front side. The bolster includes a block of compressible polymer foam in some embodiments. One or more pole sleeves may optionally be attached to the front side of the bolster. A pole inserted into a pole sleeve may be used to install or retrieve a slide out roof block. Some embodiments have an airtight cover and a valve, enabling a slide out roof block to be compressed for storage and reinflated for installation.

19 Claims, 7 Drawing Sheets

Section A - A

RECREATIONAL VEHICLE SLIDE OUT ROOF BLOCK

CROSS REFERENCE TO RELATED APPLICATIONS

This application claims the benefit of U.S. Provisional Application No. 61/124,310, filed Apr. 16, 2008.

FIELD OF THE INVENTION

The present invention relates to a device for preventing the accumulation of rain, dirt, and debris on the roof of a slide out on a recreational vehicle.

BACKGROUND

Motor homes, slide-in truck campers, camper vans, travel trailers, and other recreational vehicles may be equipped with a movable section known as a "slide out". A slide out is a movable structure that may be extended outward from an external wall of the recreational vehicle (RV), thereby increasing interior space in the RV. The slide out may be retracted back into the RV so that the RV remains below the maximum size limits for a vehicle to be moved on public roads. Some slide outs include a roll-out awning that extends automatically when the slide out is extended and rolls up automatically when the slide out is retracted. The roll-out awning extends above the roof of the slide out and is provided in part to prevent rain and debris from accumulating on the roof.

FIG. 2 shows a pictorial view of an example of an RV slide out. In FIG. 2, a slide out 10 may be seen extending outward from an outer vertical wall 12 of a part of the coach section of an RV. The slide out 10 includes two vertical side walls 14 (only one visible in FIG. 2), a vertical outer wall 16, a floor (not shown), and a roof 18. Any of the vertical walls of the slide out 10 may optionally have one or more windows, for example a window 22 in the outer wall 16. A roll-out awning 24 extends over the slide out roof 18 from the outer vertical wall 12 of the RV and may extend past the walls (14, 16) of the slide out. The roll-out awning 24 includes an awning sheet 26 attached on one side to a tensioning and retraction mechanism 28, which keeps the awning sheet 26 taut and winds the awning sheet 26 in a roll when the slide out 10 is retracted. A slide out seal 20 prevents water, dirt, and debris from entering the interior of the RV.

Many slide outs with roll-out awnings have a substantial gap between the underside of the awning sheet 26 and the slide out roof 18, as shown in FIG. 2. The gap, which may be from about two to about six inches (five to fifteen centimeters) high, is present along both sides of the slide out. Even though the awning sheet 26 may extend over the sides of the slide out roof 18, rain, dust, leaves, and other debris may enter through the gaps and accumulate on the roof, especially in windy conditions. Dirt and debris on the slide out roof 18 may damage the slide out seal 20 when the slide out 10 is moved or prevent the slide out 10 from fully retracting.

To prevent damage to the slide out seal and slide out, it is routine practice to clear the slide out roof of dirt, debris and standing water before retracting the slide out. However, the slide out roof may be higher than a person can reach from the ground, so a ladder and long-handled broom are often used to clean the roof. The longer and higher the slide out roof, the more difficult and time-consuming it is to clean. Furthermore, ascending a ladder to clean a slide out roof may be unpleasant or even unsafe in wet or windy conditions or where the ground is soft or uneven. What is needed is a device for preventing debris from entering the gap between the awning and the slide out so that the slide out roof remains clean. What is further needed is a device that may be easily installed and retrieved by a person standing on the ground. What is also needed is a device that may easily be stored in a cabinet, drawer, or bin of a size commonly found in recreational vehicles.

SUMMARY

Embodiments of the present invention comprise a slide out roof block for preventing foreign material such as rain, dirt, and debris from accumulating on a slide out roof on a recreational vehicle. A slide out roof block in accord with the present invention has a height which is equal to or slightly greater than the height of a gap between the underside of a roll-out awning and the slide out roof and a length that is equal to or slightly greater than a length of the gap along a side of the slide out roof. Some embodiments have upper and lower surfaces which are approximately parallel. Other embodiments are wedge-shaped to match an angle between a roll-out awning and a slide out roof. The slide out roof block is made from compressible materials to fit snugly into the gap and effectively prevents water, dirt, and debris from entering the gap. Slide out blocks are preferably used in pairs, with a first slide out roof block installed along a roof edge on a first side of the slide out and a second slide out roof block installed along a roof edge on a second side opposite the first side. Optionally, more than one slide out roof block may be installed end-to-end along a side of a slide out roof to fill the gap on a slide out that extends far from the side of the RV.

Embodiments of a slide out roof block include a rain flap along the bottom of a long side of the slide out roof block to prevent water from entering the contact area between the bottom of the slide out roof block and the outside surface of a slide out roof. The rain flap also has the function of providing a depth stop for a preferred installation position of a slide out roof block along an edge of a slide out roof. In some embodiments, one or more hollow pole sleeves are attached to the side of the slide out roof block with the rain flap. A pole sleeve enables a person standing on the ground to install or retrieve a slide out roof block by inserting the end of a long pole such as a broom handle into the pole sleeve and lifting, pushing, or pulling on the slide out roof block. A pole sleeve may optionally extend over the rain flap to stiffen the rain flap and aid in correct positioning of a slide out roof block on a slide out roof. A ferrule may optionally be included inside a pole sleeve to hold the pole sleeve open and to stiffen the pole sleeve and rain flap. More than one pole sleeve may optionally be provided to facilitate installation, for example by using two poles simultaneously in separate pole sleeves.

In some embodiments, a slide out roof block comprises a water-resistant cover enclosing a polymer foam core. A cover may optionally include one or more cover fasteners to permit the cover to be removed for cleaning or replacement. In some embodiments, the polymer foam core is closed-cell foam and in others the polymer foam core is open-cell foam. Other embodiments have an airtight cover, an inflation valve, and an open-cell polymer foam core so that the slide out roof block may be deflated and compressed for storage and reinflated for use. Some embodiments having an airtight cover and an inflation valve omit a polymer foam core and are inflated with air for use and deflated for storage. Yet other embodiments comprise a closed-cell foam block without a cover.

This section summarizes some features of the present embodiment. These and other features, aspects, and advantages of the embodiments of the invention will become better understood with regard to the following description and upon reference to the following drawings, wherein:

BRIEF DESCRIPTION OF THE DRAWINGS

FIG. 7 further illustrates a pole inserted into a pole sleeve to install or retrieve the slide out roof block.

DESCRIPTION

Embodiments of the invention comprise a slide out roof block adapted to fill a gap between a roll-out awning and the roof of a slide out on a recreational vehicle (RV). Slide out roof blocks are preferably used in pairs, with at least one slide out roof block placed under the roll-out awning and above the slide out roof on each of two opposite edges of the slide out roof. Embodiments of a slide out roof block are preferably made with a long dimension equal to or slightly greater than a long dimension of the gap and with a height dimension equal to or slightly greater than a height dimension of the gap. A slide out roof block fits closely to the roll-out awning and slide out roof and effectively prevents foreign material such as, but not limited to, rain, dirt, and debris from accumulating on the slide out roof.

A slide out roof block in accord with an embodiment of the invention is well suited for installation on a slide out roof that is too high for a person standing on the ground to reach unaided. Slide outs with high roofs may be found on many kinds of RVs, for example, but not limited to, a mobile home, a truck with a slide-in camper, a camper van, a travel trailer, and a touring bus. Some embodiments of a slide out roof block therefore include features which enable a person to install or retrieve the block without standing on a ladder, stepstool, or similar support.

Figure 1:
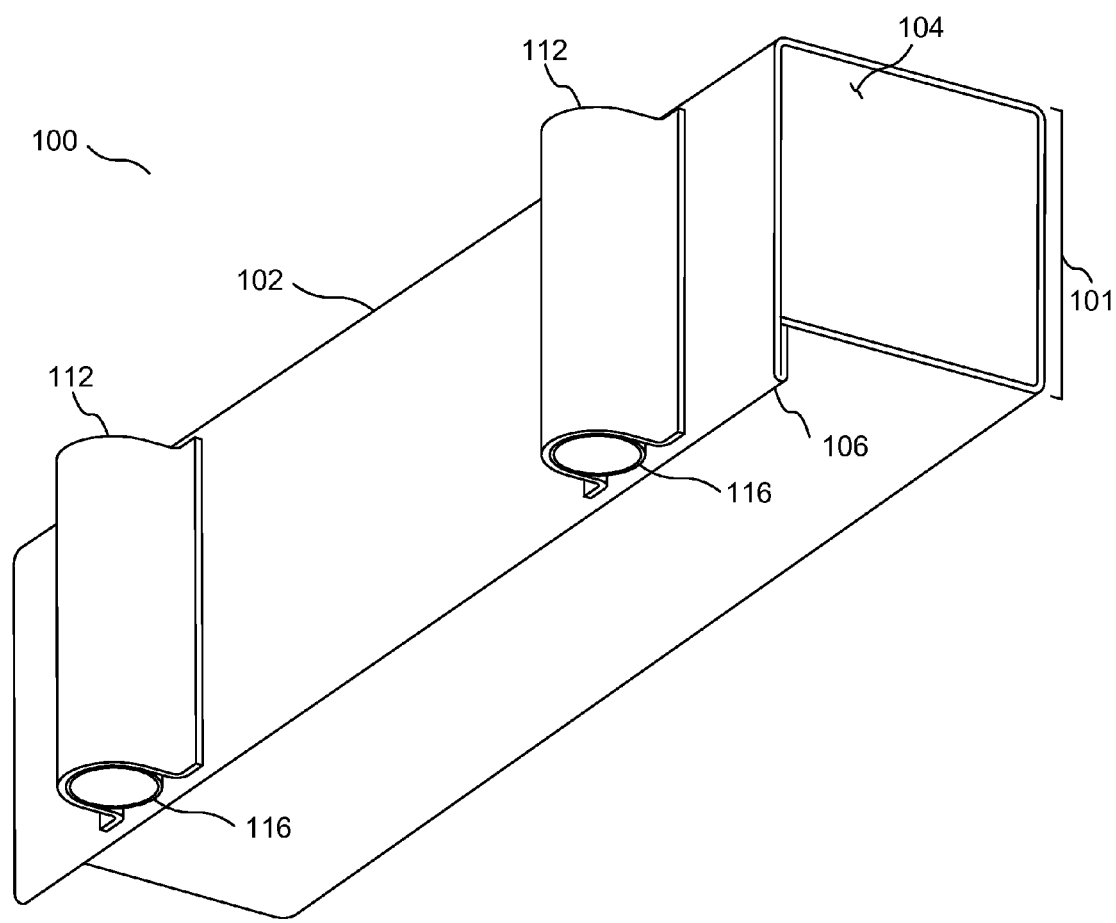
FIG. 1 is a pictorial view of an example of a slide out roof block, showing a front side, a bottom side, and an end, with and further showing a rain flap along a bottom edge of the front side and two pole sleeves attached to the rain flap and the front side.
Figure 2:
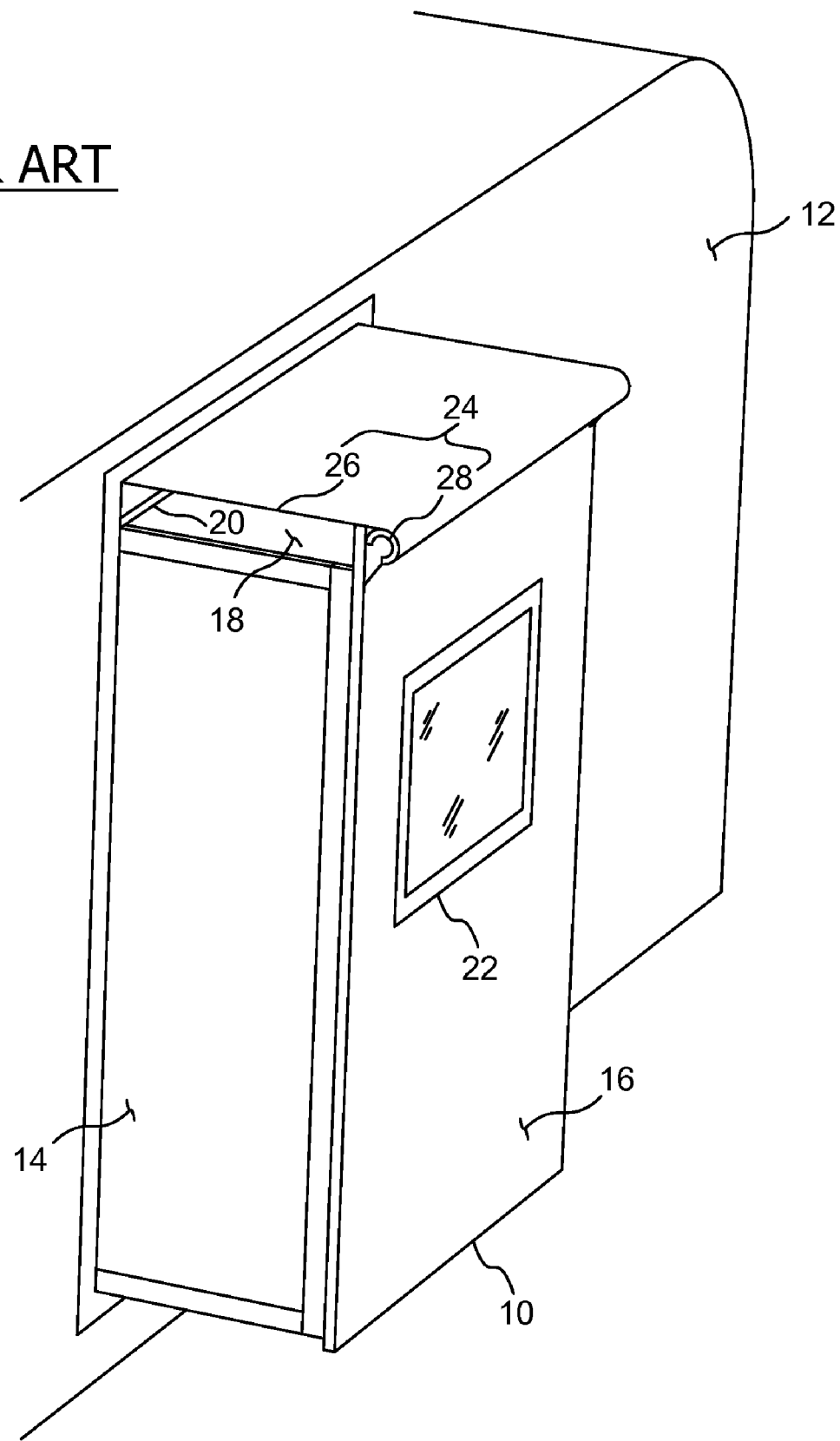
FIG. 2 is pictorial view of a portion of a recreational vehicle including a slide out with a roll-out awning, showing a gap between the roll-out awning and the roof of the slide out. (PRIOR ART)

An example of a slide out roof block is shown in FIG. 1. FIG. 1 shows a pictorial view a slide out roof block 100 comprising a rectangular bolster 101, a rain flap, and two pole sleeves. The embodiment of FIG. 1 includes a cover 102 having a pair of cover end caps 104 at opposite ends, one end cap at each end, a rain flap 106 along a bottom edge of the front face of the bolster, and two pole sleeves 112 attached to the front face and rain flap 106. Each pole sleeve 112 may alternatively be formed from a sheet of flexible material such as plastic or fabric shaped into a tube, molded from a polymer material into a tubular shape with optional flanges along the sides for attachment to the cover 102, or formed as an integral part of the cover 102. The rain flap 106 may be formed as an integral part of the cover 102 as shown in FIG. 1, or may alternately be formed as a separate part and attached to the cover 102.

A pole sleeve 112 may extend across the full height of the slide out roof block 100 as shown in FIG. 1. Alternately, a pole sleeve 112 may have a length that is less than the height dimension of the slide out roof block 100. Furthermore, a pole sleeve 112 may optionally extend over and be attached to the rain flap 106 to stiffen the rain flap. Stiffening the rain flap 106 allows the flap to serve as a depth stop for locating a slide out roof block along an edge of the slide out roof. A depth stop is useful to prevent a slide out roof block from being inserted too far into the gap under an awning sheet, making retrieval more difficult and exposing part of the slide out roof to water and debris.

The rain flap in FIG. 1 is formed from a single fold of the material used to make the cover 102. A rain flap 106 may alternatively be formed from multiple folds of material. A rain flap 106 may optionally be stiffened by enclosing a strip of plastic or metal within a fold or by including a plastic or metal ferrule in a pole sleeve attached to the rain flap. FIG. 1 shows a ferrule 116 inside each pole sleeve 112. The ferrule 116 stiffens the pole sleeve 112 and the rain flap 116 to which it is attached and also holds an end of the pole sleeve 112 open for easy insertion of a pole. An inside diameter of the ferrule is selected for a loose clearance fit of a broom handle, mop handle, or similar tool having a long handle. In one example, a ferrule is made from a short length of PVC pipe having an inner diameter of approximately 1.3 inch (3.3 centimeters), large enough to admit a kitchen broom handle.

Figure 3:
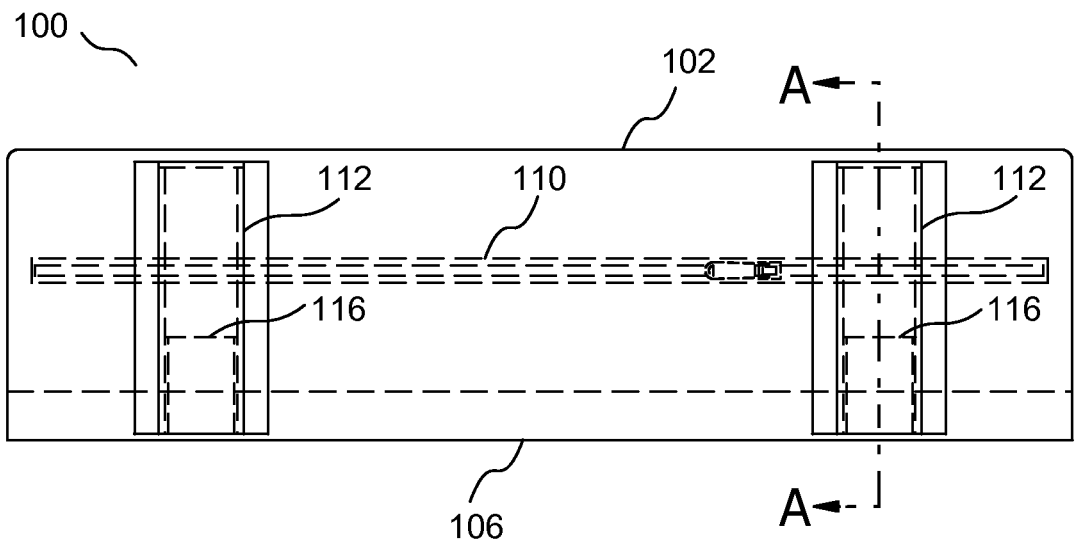
FIG. 3 is a front view of an example of a slide out roof block.
Figure 4:
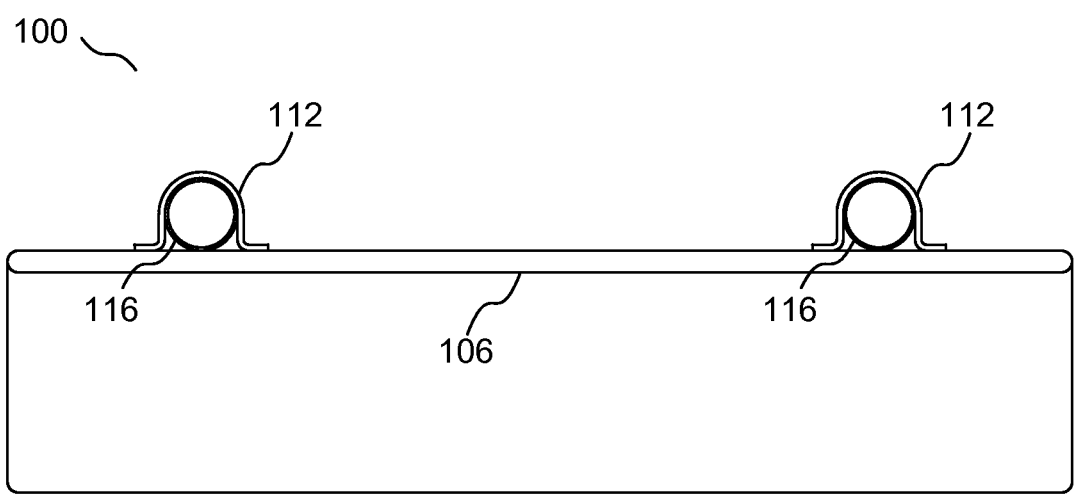
FIG. 4 is a top view of the slide out roof block of FIG. 3.
Figure 5:
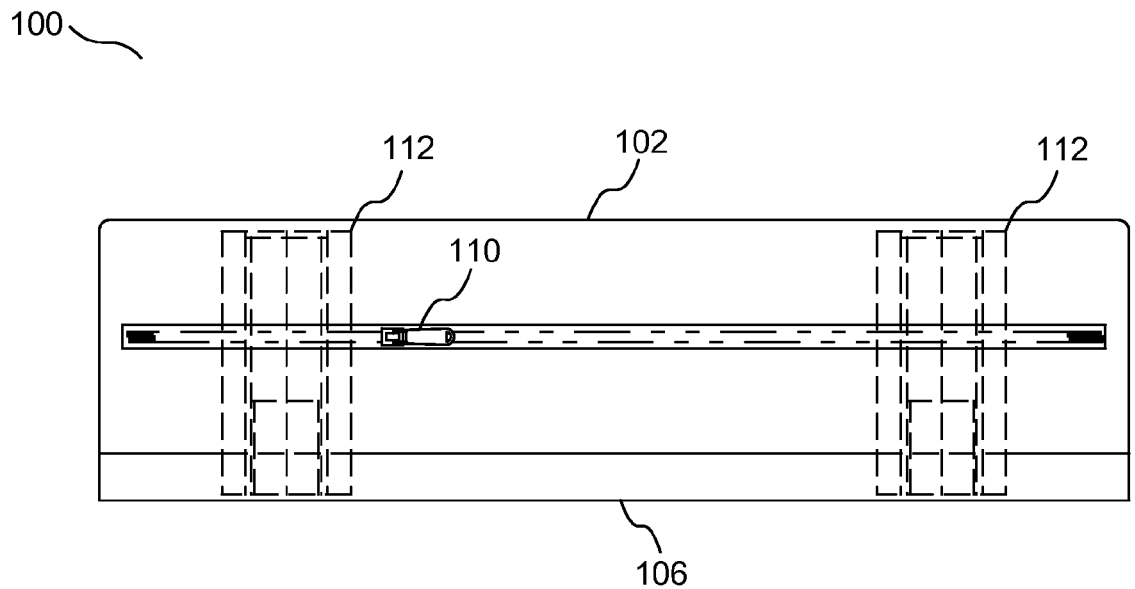
FIG. 5 is a back view of the slide out roof block of FIG. 3 and FIG. 4.

Front, bottom, and back views of the embodiment of FIG. 1 are shown in FIGS. 3, 4, and 5 respectively. In the front view of FIG. 3, a ferrule 116 extends from near the lower end of the pole sleeve 112 partway along the length of the interior of the pole sleeve. A ferrule 116 may optionally extend to the upper end of the pole sleeve 112. A cover fastener 110 is attached to the back side of the slide out roof block 100. The cover fastener 110 may be opened to remove the cover 102 for cleaning, repair, or replacement. Cover fasteners suitable for use with an embodiment of a slide out roof block include, but are not limited to, a zipper or one or more snaps, hooks, buttons, or complementary pieces of hook-and-loop fastener material. The cover fastener 110 is also shown in the back view of FIG. 5.

The bottom view of FIG. 4 shows a ferrule 116 within a pole sleeve 112. An embodiment of a slide out roof block 100 may optionally have one pole sleeve located approximately halfway along a length of the block, two pole sleeves 112 located near each end as shown in FIGS. 3 and 4, or pole sleeves may be omitted. FIG. 4 further illustrates an example of a thickness of the rain flap 106 relative to an overall depth of the slide out roof block 100. In one example, the rain flap 106 is about 0.5 inch (1.3 centimeter) thick and the slide out roof block 100 is about 22 inches (56 centimeters) long, 4 inches (10 centimeters) in height exclusive of the rain flap, and 4 inches in depth.

Figure 6:
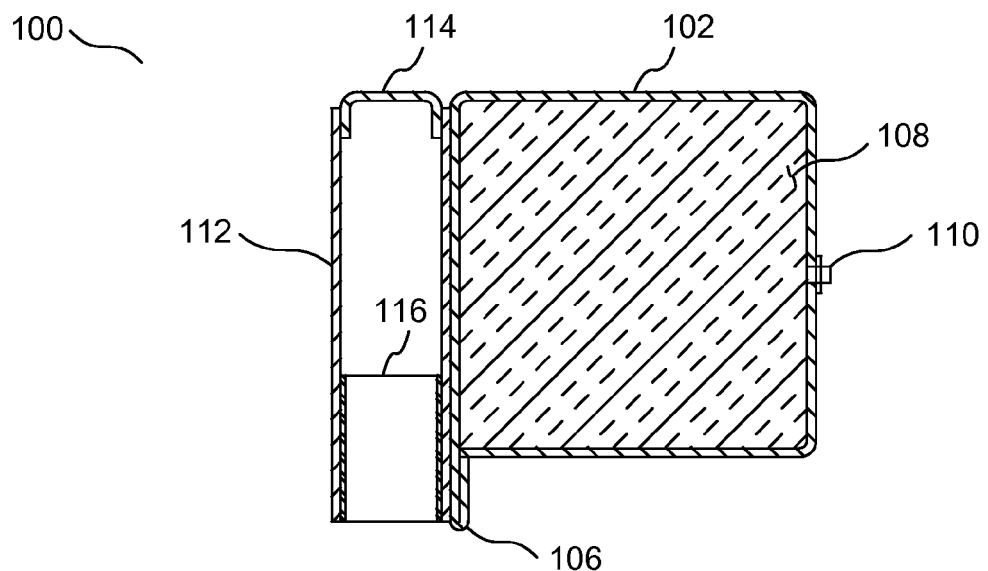
FIG. 6 is a cross-sectional view of the slide out roof block of FIGS. 3-5. A location and a viewing direction for the cross-sectional view of FIG. 6 is shown by a line marked A-A in FIG. 3.

In some embodiments, a block of polymer foam fills a rectangular part of a slide out roof block. FIG. 6 is a sectional view illustrating an example of polymer foam material inside the slide out roof block 100 of FIGS. 3-5. A location and viewing direction for section A-A in FIG. 6 are shown by a line marked A-A in FIG. 3. In FIG. 6, a pole sleeve 112 is attached to a front side of the example of a slide out roof block 100. A cover fastener 110 is attached to a back side. A ferrule 116 extends from the bottom of the pole sleeve 112 partway up the height of the pole sleeve. A sleeve cap 114 closes the upper end of the pole sleeve 112. A polymer foam block 108 fills the rectangular portion of the slide out roof block 100 inside the cover 102. The polymer foam block may alternately be made from closed-cell foam or open-cell foam.

Figure 7:
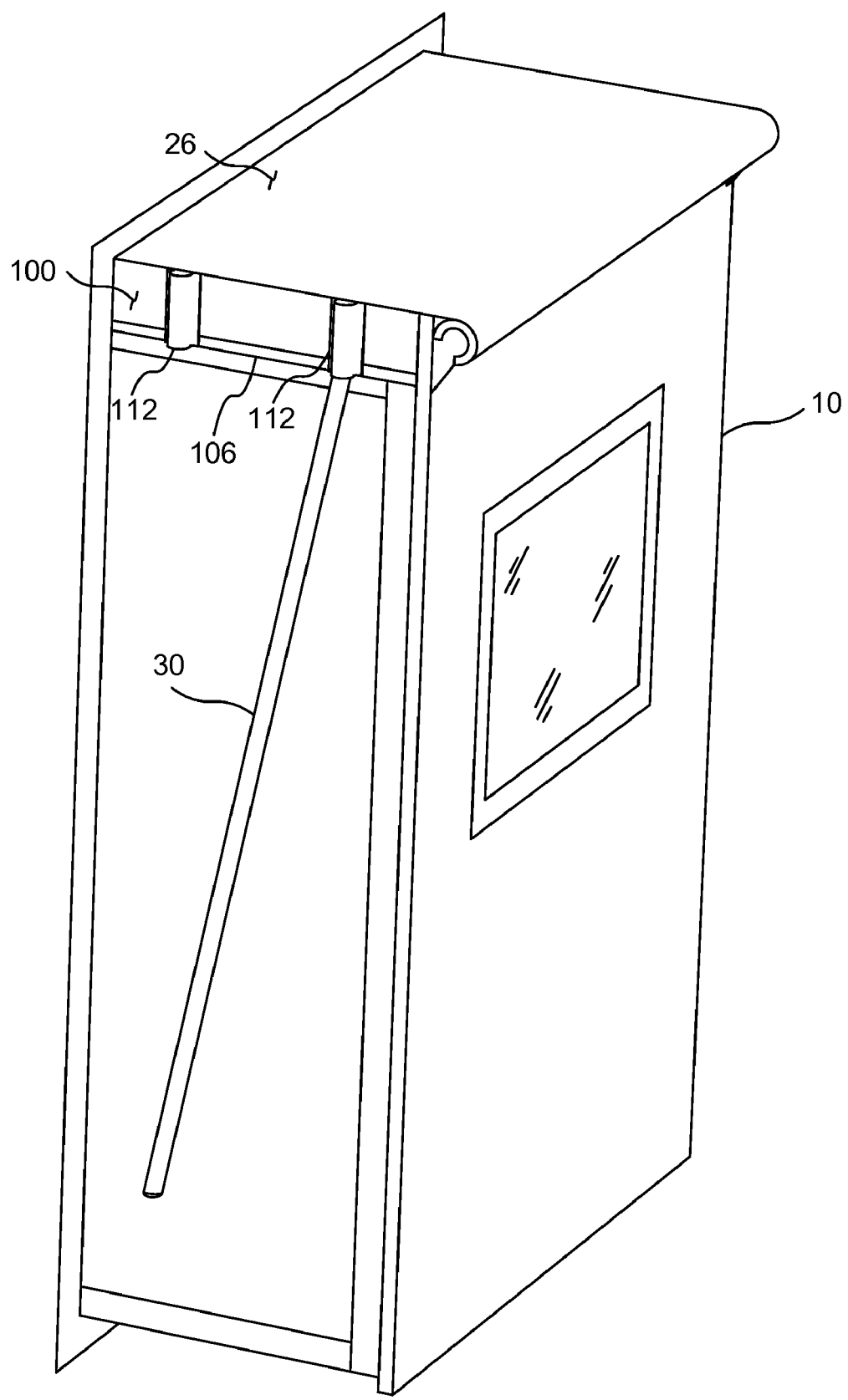
FIG. 7 is a pictorial view of an example of a slide out roof block installed on the example of a slide out of FIG. 2.

FIG. 7 shows an example of a slide out roof block 100 installed between an awning sheet 26 and the roof of a slide out 10. In FIG. 7, the top side of the slide out roof block 100 is in contact with and at least partially covered by the awning sheet 26. The bottom side of the slide out roof block 100 is in contact with the roof of the slide out 10. The rain flap 106 is in contact with a side wall of the slide out 10 and lies along the edge between the side wall and roof of the slide out 10. In the example of FIG. 7, the pole sleeves 112 extend over and are attached to the rain flap 106, as in the example of FIG. 1, thereby preventing the slide out roof block 100 from being pushed too far under the awning sheet 26. The ends of the slide out roof block are in contact with the outer wall of the slide out 10 on one end and extend on the other end into the body of the recreational vehicle, that is, inside the plane of the outer wall of the recreational vehicle. The plane of the outer wall of the recreational vehicle is indicated by a frame around the left end of the slide out 10 in FIG. 7.

FIG. 7 further illustrates the use of a pole 30 for placing a slide out roof block 100 in a preferred position between the awning sheet 26 and the roof of the slide out 10. An end of a round pole 30 about 1 inch (2.5 centimeters) in diameter and long enough to reach the awning sheet 26 is inserted into a first pole sleeve 112 on the slide out roof block 100. The slide out roof block 100 is lifted up on the end of the pole 30 and pushed into the gap between the roof of the slide out 10 and the underside of the awning sheet 26 until the rain flap 106 contacts the edge of the roof. The pole 30 is then removed from the first pole sleeve 112 and inserted into the second pole sleeve 112 and the slide out roof block 100 is moved until the rain flap 106 is in continuous contact with the roof edge along the full length of the rain flap 106 and an end of the slide out roof block 100 contacts an inner surface of the outer wall of the slide out 10. Two poles 30 may optionally be used simultaneously, one pole in each pole sleeve, to quickly position the slide out roof block 100. A second slide out roof block 100 is placed on a side of the slide out 10 opposite the side visible in FIG. 7. To retrieve a slide out roof block 100 from above a slide out 10, a pole 30 is inserted into a pole sleeve 112 and the slide out roof block is pulled away from the slide out 10 and lowered on the end of the pole.

Figure 8:
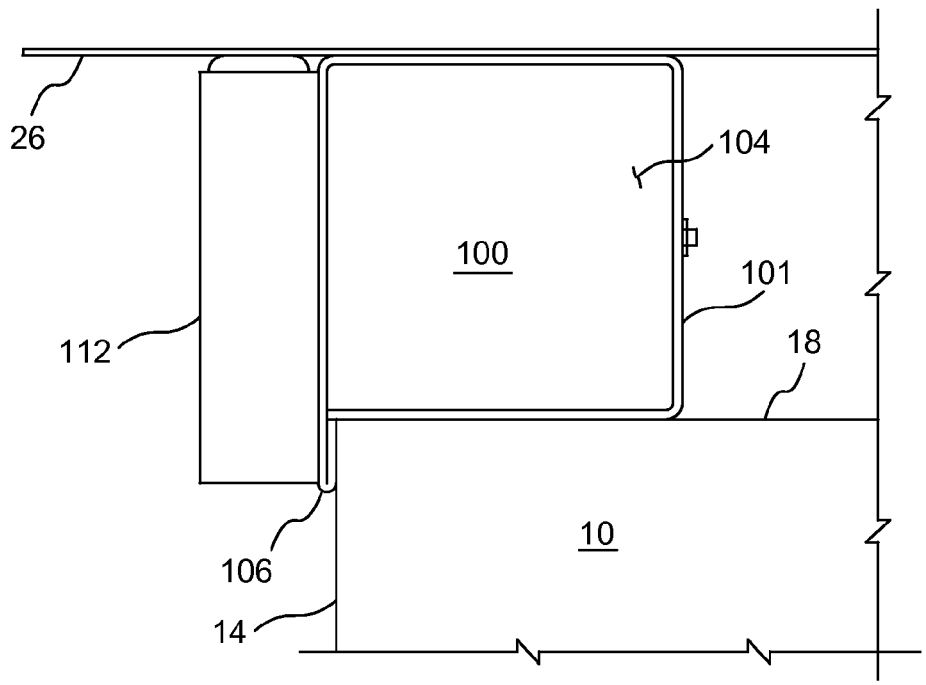
FIG. 8 is a partial end view of a slide out roof block in a preferred installation position between a slide out roof and an awning sheet.

FIG. 8 shows a partial end view of a slide out roof block in a preferred installation position between the roof 18 of a slide out 10 and the underside of an awning sheet 26. In the end view of FIG. 8, a cover end cap 104 of the slide out roof block 100 is facing the viewer. The awning sheet 26 extends beyond the edge of the slide out roof 18 and covers the slide out roof block 100. The rain flap 106 is shown in contact with a side wall 14 of the slide out 10. A pole sleeve 112 attached to the rain flap 106 stiffens the rain flap 106 and prevents the slide out roof block 100 from being pushed too far into the gap between the awning sheet 26 and roof 18. Any water, dirt, or debris blown under the awning sheet 26 strikes the front face of the slide out roof block (the face to which the pole sleeves 112 are attached) and falls downward rather than accumulating on the slide out roof 18. The rain flap 106 further prevents water on the front face of the slide out roof block 100 from flowing into the contact area between the bottom side of the bolster 101 and the slide out roof 18.

The cover 102 of the slide out roof block 100 may optionally be made from a water-resistant material, for example, but not limited to, vinyl, vinyl-coated fabric, or another flexible plastic or water-resistant fabric. The cover 102, pole sleeves 112, cover end cap 104, and rain flap 106 may be joined together by stitching, adhesive, fusing, riveting, or other means for joining together sheet materials. The rain flap 106 may optionally be formed as an integral part of the cover 102 as shown in FIG. 1, or may be formed as a separate part and attached to the cover 102.

Figure 9:
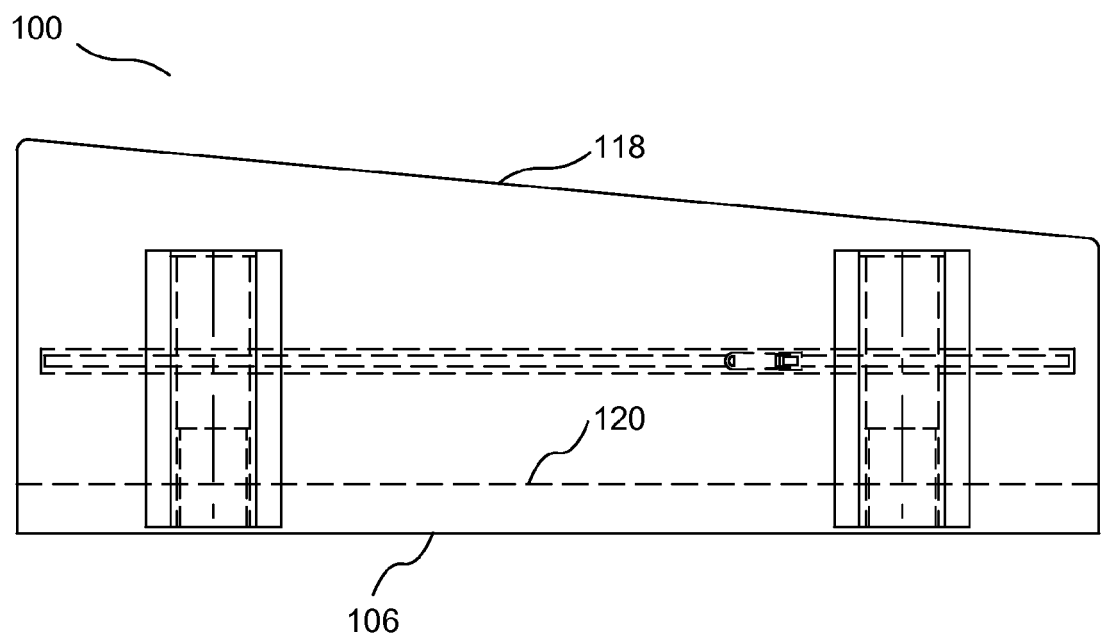
FIG. 9 is a front view of an example of a slide out roof block having a wedge shape for a close fit under an awning sheet that is at an angle to a slide out roof.

In some embodiments, the top side and the bottom side of a slide out roof block are approximately parallel, that is, the slide out roof block is approximately rectangular in shape. A rectangular shape is suitable for slide outs having an awning sheet in a plane approximately parallel to the plane of the slide out roof. Some embodiments of a slide out roof block are wedge shaped to achieve a close fit between a slide out roof and an awning sheet that is not parallel to the slide out roof. For example, some awning sheets slope downward from the outer wall of the RV to the end of the slide out to cause water falling on the awning sheet to flow away from the outer wall of the RV. A slide out roof block formed into a wedge-shaped bolster for fitting under an awning sheet at an angle to a slide out roof is shown in FIG. 9. In FIG. 9, an edge 120 of the bottom surface of an embodiment of a slide out roof block 100 is approximately parallel to an edge of the rain flap 106. An edge 118 of the top surface of the slide out roof block 100 is at an angle relative to the edge 120 of the bottom surface. An angle between the edge 118 of the top surface and an edge 120 of the bottom surface of the slide out roof block 100 is preferably approximately equal to an angle between an outer surface of a slide out roof and the underside of an awning sheet. Embodiments of slide out roof blocks formed into wedge-shaped bolsters are preferably manufactured in pairs wherein one member of the pair is a mirror image of the other, that is, there is a left-side and a right-side slide out roof block.

Figure 10:
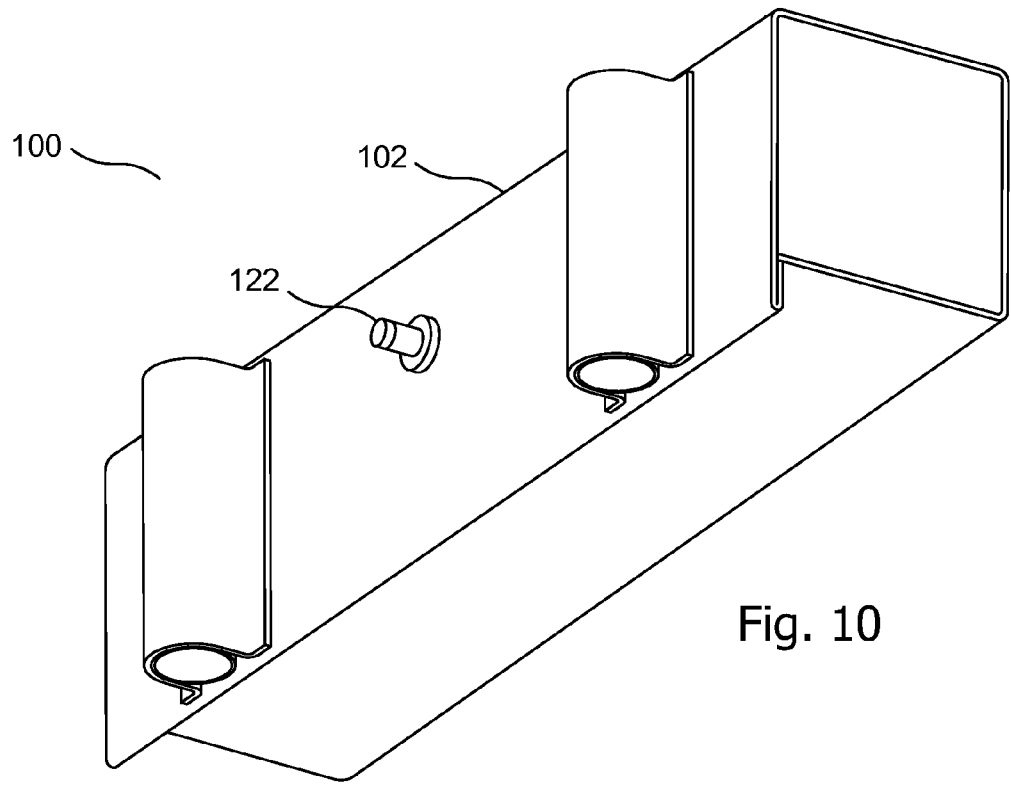
FIG. 10 is pictorial view of an example of a slide out roof block having an airtight cover and an inflation valve.

It may be advantageous to reduce a volume occupied by a slide out roof block, for example to enable the block to be stored in a drawer or cabinet. Some embodiments of a slide out roof block may be compressed to occupy a fraction of their full volume. For example, the slide out roof block 100 of FIG. 10 comprises a rectangular bolster with a cover 102 which is airtight. A valve 122 attached to an outer surface of the slide out roof block 100, preferably the front surface as shown in FIG. 10, may be opened to introduce air into a cavity inside the cover 102 and then sealed so the slide out roof block retains the shape shown in the figure. The valve 122 may be opened to let air inside the slide out roof block escape, thereby reducing a volume occupied by the block. The valve 122 may optionally be opened before the slide out roof block 100 is retrieved from above a slide out roof to make the slide out roof block easier to pull out from between the awning sheet and slide out roof. Alternately, the slide out roof block of FIG. 10 may be made with a wedge shape, similar to the embodiment of FIG. 9.

The interior of the embodiment shown in FIG. 10, that is, a space enclosed by the cover 102, may optionally be filled with a block of open-cell polymer foam. The cross-sectional view of a slide out roof block shown in FIG. 6 applies to the current example when the polymer foam block 108 in FIG. 6 is an open-cell polymer foam, the cover 102 is an airtight cover, and the cover fastener 110 is either adapted for an airtight seal, for example by interlocking plastic ridges as in some plastic storage bags, or is omitted. Upon opening the valve 122 of a slide out roof block 100 compressed for storage, the resilience (also referred to as "shape memory") of the open cell foam inside the slide out roof block 100 causes the foam to expand, drawing air into the cover and automatically inflating the slide out roof block until the foam returns to its original size and shape. After the bolster is inflated, the valve 122 is closed and the slide out roof block 100 is installed as previously described. For storage, the valve 122 is opened, the slide out roof block 100 is compressed, and the valve is reclosed so the block retains its compressed volume.

Figure 11:
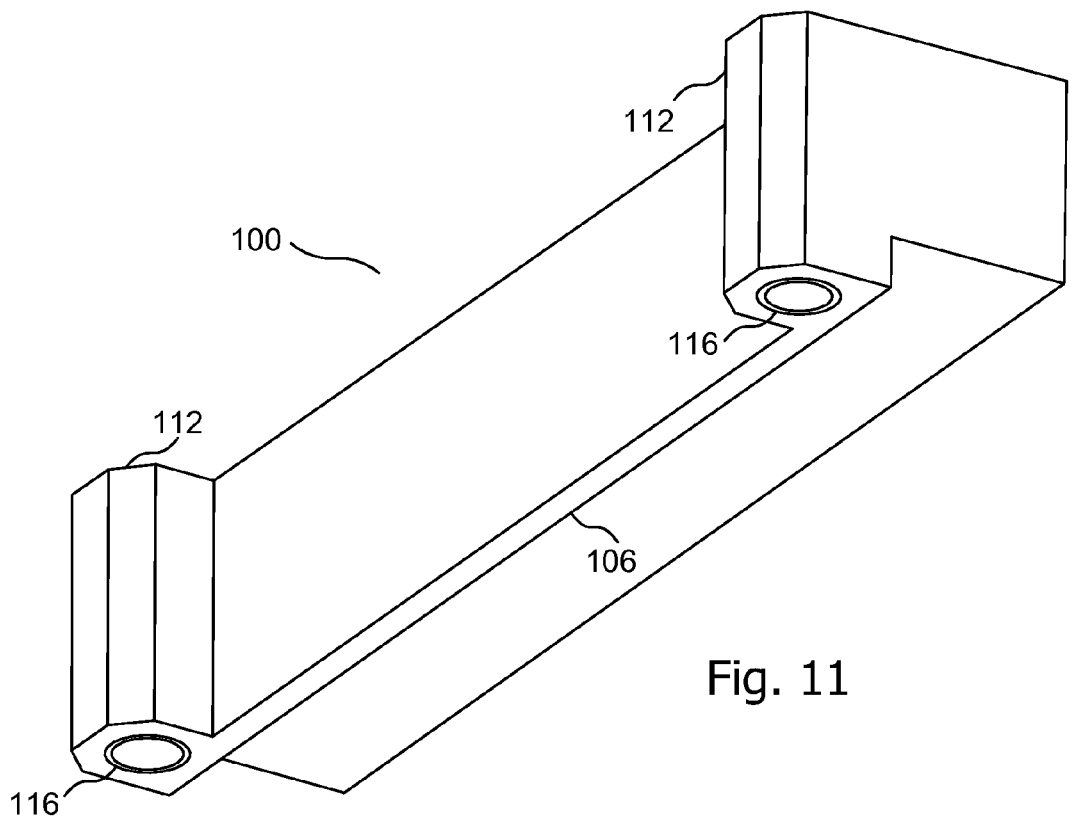
FIG. 11 is pictorial view of an example of a slide out roof block comprising closed-cell polymer foam. The embodiment of a slide out roof block in FIG. 11 is shown without an optional cover.

A slide out roof block may optionally be formed from a single piece of molded polymer foam, preferably closed-cell foam, eliminating the need for manufacturing a cover and leading to a reduction in the cost of producing many units. An example of a slide out roof block comprising a block of closed-cell foam is shown in FIG. 11. In FIG. 11, the pole sleeves 112 and rain flap 106 have been formed as integral parts of the slide out roof block 100. Ferrules 116 may optionally be inserted into the pole sleeves 112 so a pole inserted into the pole sleeve will not damage the foam. Alternately, the slide out roof block of FIG. 11 may be made with a wedge shape, similar to the embodiment of FIG. 9.

Slide outs having different depths, that is, the distance by which a slide out extends from the outer wall of an RV, are known in the art. Embodiments of slide out roof blocks may be manufactured in lengths and heights needed to fill the gap above a slide out for a variety of slide out depths and separation distances between awning sheets and slide out roofs. Alternatively, slide out roof blocks may be manufactured with relatively short length dimensions and the blocks stacked end-to-end to fill a gap above a slide out roof. The compressibility of individual slide out roof blocks is advantageous for achieving a close fit for a plurality of slide out roof blocks placed end-to-end above a slide out roof.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings.

What is claimed is:

1. A device for preventing foreign material from accumulating between an awning sheet and a roof on a recreational vehicle slide out, comprising:
    a compressible bolster having a front side, a top side, a bottom side, and a height dimension from said bottom side to said top side equal to or greater than a separation distance between the awning sheet and the roof on a recreational vehicle slide out;
    a rain flap attached along an edge between said front side and said bottom side of said bolster, wherein said rain flap is approximately perpendicular to said bottom side of said bolster; and
    a first pole sleeve attached to said front side of said bolster.

2. The device for preventing foreign material from accumulating between an awning sheet and a roof on a recreational vehicle slide out of claim 1, further comprising a second pole sleeve attached to said front side of said bolster.

3. The device for preventing foreign material from accumulating between an awning sheet and a roof on a recreational vehicle slide out of claim 2, further comprising a first ferrule inside said first pole sleeve.

4. The device for preventing foreign material from accumulating between an awning sheet and a roof on a recreational vehicle slide out of claim 3, further comprising a second ferrule inside said second pole sleeve.

5. The device for preventing foreign material from accumulating between an awning sheet and a roof on a recreational vehicle slide out of claim 1, wherein said bolster comprises a block of compressible polymer foam.

6. The device for preventing foreign material from accumulating between an awning sheet and a roof on a recreational vehicle slide out of claim 5, wherein said polymer foam is closed-cell foam.

7. The device for preventing foreign material from accumulating between an awning sheet and a roof on a recreational vehicle slide out of claim 6, wherein said pole sleeve and said rain flap are formed as integral parts of said bolster.

8. The device for preventing foreign material from accumulating between an awning sheet and a roof on a recreational vehicle slide out of claim 4, wherein said bolster further comprises a cover.

9. The device for preventing foreign material from accumulating between an awning sheet and a roof on a recreational vehicle slide out of claim 8, further comprising a cover fastener attached to said cover.

10. The device for preventing foreign material from accumulating between an awning sheet and a roof on a recreational vehicle slide out of claim 9, wherein said cover is removable from said bolster.

11. The device for preventing foreign material from accumulating between an awning sheet and a roof on a recreational vehicle slide out of claim 10, wherein said cover is made from a water-resistant fabric.

12. The device for preventing foreign material from accumulating between an awning sheet and a roof on a recreational vehicle slide out of claim 8, wherein said cover is airtight.

13. The device for preventing foreign material from accumulating between an awning sheet and a roof on a recreational vehicle slide out of claim 12, further comprising a valve on said front face of said bolster.

14. The device for preventing foreign material from accumulating between an awning sheet and a roof on a recreational vehicle slide out of claim 13, wherein said polymer foam is open-cell foam.

15. The device for preventing foreign material from accumulating between an awning sheet and a roof on a recreational vehicle slide out of claim 2, wherein an angle between said top side and said bottom side of said bolster is approximately equal to an angle between the awning sheet and the roof.

16. The device for preventing foreign material from accumulating between an awning sheet and a roof on a recreational vehicle slide out of claim 2, wherein said bolster has an approximately rectangular cross section.

17. The device for preventing foreign material from accumulating between an awning sheet and a roof on a recreational vehicle slide out of claim 16, wherein said bolster has a wedge shape.

18. The device for preventing foreign material from accumulating between an awning sheet and a roof on a recreational vehicle slide out of claim 2, wherein said first pole sleeve and said second pole sleeve are attached to said bolster and to said rain flap.

19. The device for preventing foreign material from accumulating between an awning sheet and a roof on a recreational vehicle slide out of claim 18, wherein said rain flap functions as a depth stop for a preferred position of said bolster on the roof.

* * * * *